United States Patent
Saito et al.

(10) Patent No.: US 8,549,901 B2
(45) Date of Patent: Oct. 8, 2013

(54) SENSOR STRUCTURE

(75) Inventors: Takayuki Saito, Hitachinaka (JP); Keiji Hanzawa, Mito (JP); Takayuki Yogo, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/367,939

(22) Filed: Feb. 7, 2012

(65) Prior Publication Data
US 2012/0198925 A1 Aug. 9, 2012

(30) Foreign Application Priority Data

Feb. 9, 2011 (JP) .................................. 2011-025559

(51) Int. Cl.
*G01M 15/04* (2006.01)
(52) U.S. Cl.
USPC ..................................................... 73/114.33
(58) Field of Classification Search
USPC ... 73/114.32–114.34, 114.37, 204.11–204.27
See application file for complete search history.

(56) References Cited

U.S. PATENT DOCUMENTS

| | | | |
|---|---|---|---|
| 6,012,432 A | 1/2000 | Igarashi et al. | |
| 6,332,356 B1 | 12/2001 | Hecht et al. | |
| 7,520,051 B2 * | 4/2009 | Becke et al. | 29/832 |
| 8,091,413 B2 * | 1/2012 | Saito et al. | 73/114.33 |
| 8,215,160 B2 * | 7/2012 | Saito et al. | 73/114.34 |
| 2008/0163683 A1 | 7/2008 | Becke et al. | |
| 2008/0302173 A1 | 12/2008 | Saito et al. | |
| 2010/0031737 A1 * | 2/2010 | Saito et al. | 73/114.33 |
| 2011/0072894 A1 * | 3/2011 | Saito et al. | 73/114.34 |
| 2012/0079879 A1 * | 4/2012 | Saito et al. | 73/114.33 |

FOREIGN PATENT DOCUMENTS

| | | |
|---|---|---|
| EP | 2 154 494 A1 | 2/2010 |
| JP | 9-170940 A | 6/1997 |
| JP | 10-197305 A | 7/1998 |
| JP | 3523022 B2 | 2/2004 |
| JP | 2008-197122 A | 8/2008 |
| JP | 2008-304232 A | 12/2008 |
| JP | 2010-43883 A | 2/2010 |

OTHER PUBLICATIONS

European Search Report dated Jun. 6, 2012 (three (3) pages).
Japanese-language Office Action dated May 21, 2013 (Three (3) pages).

* cited by examiner

*Primary Examiner* — Freddie Kirkland, III
(74) *Attorney, Agent, or Firm* — Crowell & Moring LLP

(57) ABSTRACT

In relation to a humidity sensor sensitive to water and contamination, a sensor implementation structure that achieves both protection performance against water and contaminants and measurement performance such as humidity responsiveness is provided. A sensor structure has a mass airflow measurement element that measures a mass airflow flowing in an intake pipe, a humidity sensing element that senses humidity of air flowing in the intake pipe, a housing structural component having a connector that carries out input/output to/from outside and a terminal component of the connector, and a bypass passage that is composed by using part of the housing structural component and takes in part of the air that flows in the intake pipe, the mass airflow measurement element being mounted in the bypass passage; wherein space is provided in the housing structural component in the vicinity of the bypass passage, the humidity sensing element is mounted in the space.

18 Claims, 12 Drawing Sheets

SENSOR STRUCTURE

BACKGROUND OF THE INVENTION

1. Field of the Invention

The present invention relates to a sensor structure suitable for physical quantity measurement about intake air of an internal combustion engine and to an internal combustion engine control device using the structure.

2. Background Art

As a physical quantity measuring technique about intake air for an internal combustion engine, for example, about a flow rate measuring technique, a mass airflow measurement device of a heating resistor type is known (see JP Patent No. 3523022). This utilizes the fact that the heat quantity taken away from the heating resistor has a correlation with an inflow flow rate, and this is widely used particularly as a flow meter for air-fuel ratio control of automobiles since the mass flow rate required in combustion control of an engine can be directly measured.

Furthermore, as other physical quantity measuring techniques about the intake air for internal combustion engines, a sensor having a plurality of measurement functions integrating a flow rate measurement device, a pressure measurement device, a humidity detection device, etc. is shown as publicly known techniques as examples in which an airflow sensor, a humidity sensor, and a pressure sensor are integrated in JP Patent Publication (Kokai) No. 2008-304232 and JP Patent Publication (Kokai) No. 2010-43883.

SUMMARY OF THE INVENTION

An automobile using an electronic control fuel injection system has become common, and further enhancement in the performance and functions thereof have been recently developing. In that case, various sensors and control devices are densely disposed in an engine room, and wire harnesses which mutually connect various sensors, control devices, and control units, etc. for controlling them are also complex.

Under such circumstances, reduction in the number of parts and improvement of the appearance in the engine room achieved by integrating the plurality of sensors and control devices are desired. For example, a measure of integrating a flow rate measurement device, a temperature detection device, a semiconductor-type pressure measurement device, a humidity detection device, etc. and sharing a connector is an example thereof, and, by virtue of this, the number of steps of parts assembly with respect to a vehicle can be reduced, and wire harnesses can be simplified.

Conventionally, the above described structure that integrates the flow rate measurement device and the temperature detection device has been a mainstream. However, as described above, as the pressure measurement device, the humidity detection device, etc. are also integrated in the future, various technical problems emerge.

Normally, the intake air of an automobile is configured to be taken in after removing the substances floating in the air by an air filter element provided in an air cleaner box. However, since large pressure loss generated by the air filter element that causes engine output reduction and fuel consumption rate deterioration is not desired, for example, a paper filter that captures fine carbon, etc. contained in an exhaust gas is not used, and fine floating substances, etc. in the air pass through the paper filter and are taken into the engine.

After the engine is stopped, the engine oil exposed to high temperature becomes vapor and sometimes flows back to the air cleaner box side. Therefore, the air that exists in or passes through the intake air pipe in the downstream of the air cleaner box is not always clean. Moreover, recently, the electronic control of a diesel engine has been advancing, and a diesel engine is harsher than a gasoline engine system as an environment for installing sensors.

The sensors in such an environment are densified as described above, and the demands for higher accuracy are further increasing in the future. In order to increase accuracy, the capability of maintaining the accuracy as long as possible is very important, and so consideration for anti-contamination property is required. Conventionally, an intake air flow meter, an intake air temperature meter, an intake air pressure meter, etc. have been widely used as intake sensors. However, in the future, the tendency that measurement of intake air humidity is also used in the control of an internal combustion engine is strong. Particularly, the humidity sensor is a sensor that has high sensitivity to contamination, therefore, an implementation structure that achieves all of measurement accuracy, measurement responsiveness, and anti-contamination property will be a problem.

JP Patent Publication (Kokai) No. 2010-43883 shows a second bypass air passage which bypasses a bypass passage. However, although JP Patent Publication (Kokai) No. 2010-43883 assumes that obstructing intake of contaminants is an effect, there is basically a presupposed condition that the contaminants and water droplets are taken in together with air. Furthermore, there is no measure even against the case in which a small amount of contaminants are actually taken in.

It is an object of the present invention to provide a sensor structure capable of measuring humidity with good accuracy and preventing entry of contaminants, water droplets, etc.

In order to solve the above described problems, a sensor structure has a mass airflow measurement element that measures a mass airflow flowing in an intake pipe, a humidity sensing element that senses humidity of air flowing in the intake pipe, a housing structural component having a connector that carries out input/output to/from outside and a terminal component of the connector, and a bypass passage that is composed by using part of the housing structural component and takes in part of the air that flows in the intake pipe, the mass airflow measurement element being mounted in the bypass passage; wherein space is provided in the housing structural component in the vicinity of the bypass passage, the humidity sensing element is mounted in the space, and the part of the space does not have a structure sealed by an adhesive, a seal material, or the like.

According to the present invention, a sensor structure capable of measuring humidity with good accuracy and preventing entry of contaminants and water droplets can be provided.

DETAILED DESCRIPTION OF THE PREFERRED EMBODIMENTS

Figure 1A:
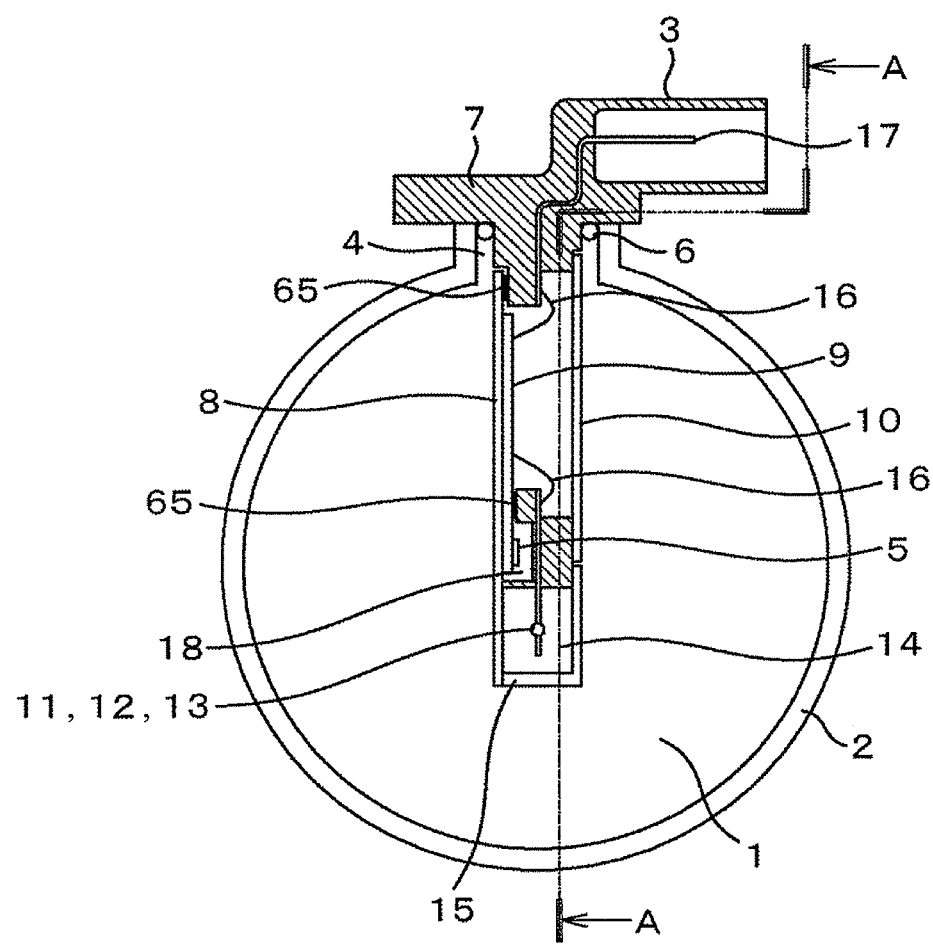
FIG. 1A is a sensor structure drawing showing an embodiment of the present invention.
Figure 1B:
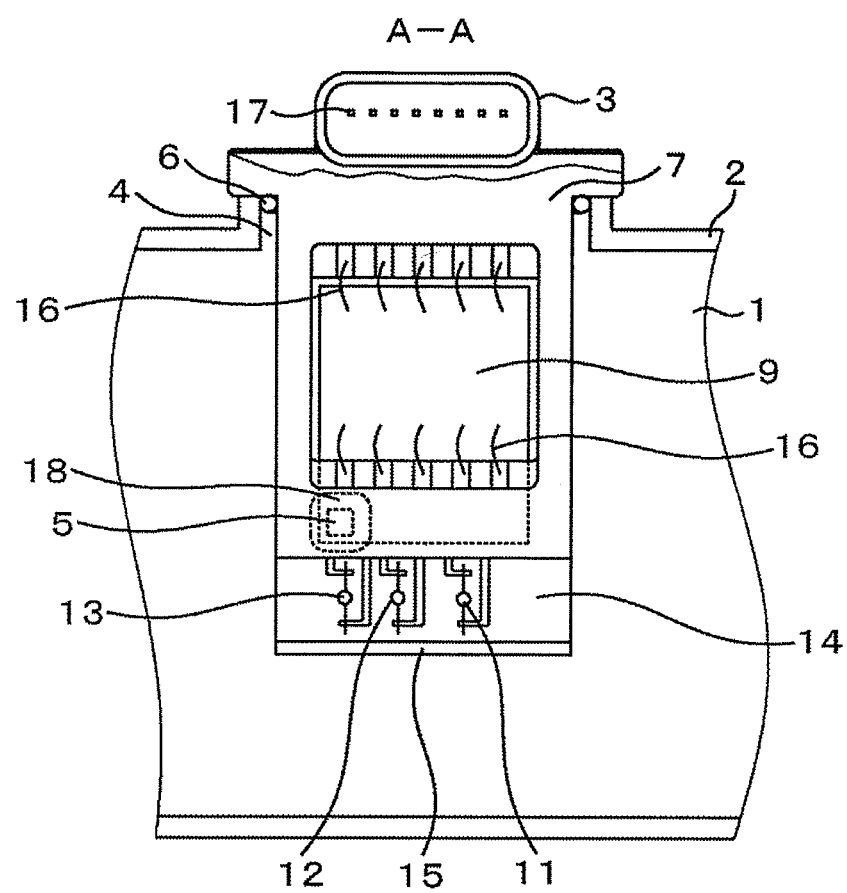
FIG. 1B is an A-A cross sectional view of FIG. 1A.

A specific configuration example of the present invention will be explained by using FIG. 1.

An installation hole 4 in which part of a mass airflow measurement device 3 is installed is provided in part of a main air flow passage component (intake pipe line component) 2 constituting a main air flow passage (also referred to as "intake pipe line" or simply "intake pipe") 1, and the mass airflow measurement device 3 is installed thereat via a seal material 6.

The mass airflow measurement device 3 is composed of: a base plate 8; a cover 10 for protecting an electronic circuit board 9; a heating resistor 11 for measuring the mass airflow; a temperature compensation resistor 12 used in mass airflow measurement; an intake air temperature sensor 13 used in the vehicle side; a bypass air passage 14 in which the heating resistor 11, the temperature compensation resistor 12, etc. are mounted; a bypass air passage structural component 15 for constituting the bypass air passage 14; and so on in addition to a housing structural component 7. Each of the parts is fixed by using an adhesive 65, and particularly the region in which the electronic circuit board 9 is mounted is sealed so that exhaust gases and water from outside do not enter.

The heating resistor 11, the temperature compensation resistor 12, and the intake air temperature sensor 13, which detect the intake mass airflow and intake air temperature, are connected to the electronic circuit board 9 via bonding wires 16. Furthermore, the electronic circuit board 9 is similarly electrically connected to connector terminals 17 via bonding wires 16, and inputs/outputs to/from the outside are carried out via the connector terminals 17.

A humidity sensing element 5 is installed on the electronic circuit board 9 of the mass airflow measurement device 3, and the humidity sensing element 5 is positioned in open space 18 formed in the housing structural component 7. The open space 18 is composed only of the combination of the base plate 8 and the housing structural component 7 in the vicinity of the bypass air passage 14, and gas exchange can be carried out therein without using a seal agent, an adhesive, or the like. By virtue of this configuration, humidity can be measured with good accuracy, and complete isolation from contaminants and water droplets floating in the air is enabled.

Figure 2:
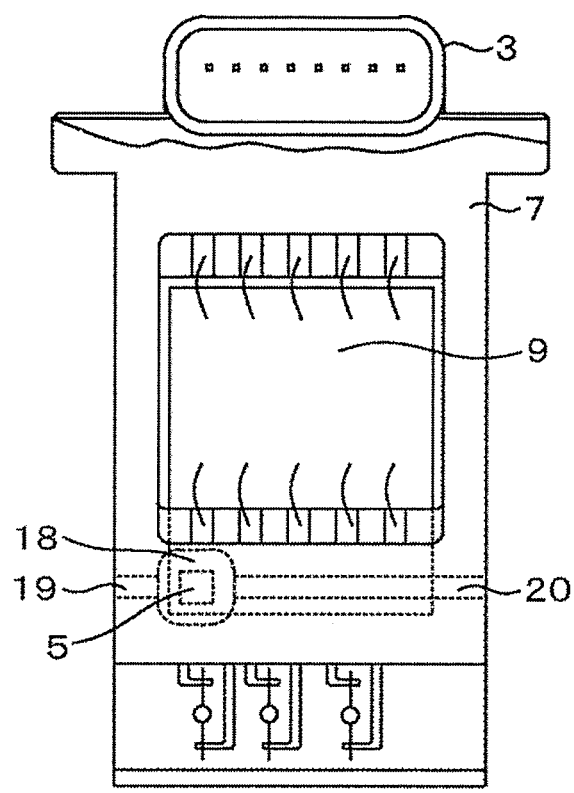
FIG. 2 is a sensor structure drawing showing another embodiment of the present invention.

FIG. 2 is a sensor structure drawing showing another embodiment of the present invention. The humidity sensing element 5 is installed on the electronic circuit board 9 of the mass airflow measurement device 3, and the humidity sensing element 5 is mounted in the open space 18 formed in the housing structural component 7. An air communication channel-A 19, which communicates between the open space 18 and the upstream side of the main air flow passage 1, and an air communication channel-B 20, which communicates between the open space 18 and the downstream side of the main air flow passage 1, are provided to enable ventilation to the open space 18. By virtue of the present configuration, responsiveness of humidity detection can be improved. However, isolation from the contaminants and water droplets floating in the air becomes difficult in this configuration, and, in that case, anti-contamination property is improved by removing the air communication channel-B 20 and causing only the air communication channel-A 19 to function.

Figure 3:
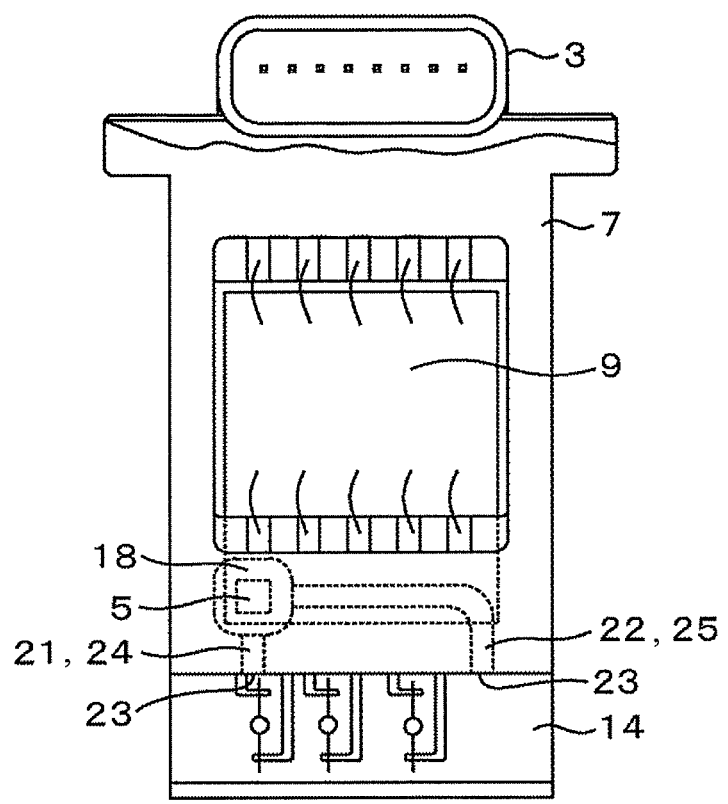
FIG. 3 is a sensor structure drawing showing another embodiment of the present invention.

FIG. 3 is a sensor structure drawing showing another embodiment of the present invention. The humidity sensing element 5 is installed on the electronic circuit board 9 of the mass airflow measurement device 3, and the humidity sensing element 5 is mounted in the open space 18 formed in the housing structural component 7.

An air communication channel-C 21, which communicates between and connects the open space 18 and the bypass air passage 14 to each other in the upstream side of the bypass air passage 14, and an air communication channel-D 22, which communicates between and connects the open space 18 and the bypass air passage 14 to each other in the downstream side of the bypass air passage 14, are provided. Furthermore, air communication openings 23 of the air communication channel-C 21 and the air communication channel-D 22 in the bypass air passage 14 are parallel to the flow of the air in the bypass air passage 14, thereby significantly reducing the risk of taking in the contaminants and water droplets floating in the air.

The inner pressures of the air communication channel-C positioned in the upstream side and the air communication channel-D positioned in the downstream side have the relation of "air communication channel-C>air communication channel-D" because of the influence of pressure loss caused by pipe line friction, etc. of the bypass air passage 14. Therefore, the air communication channel-C 21 is an air introduction channel 24 having the function of taking in part of the air flowing in the bypass air passage 14, the air communication channel-D 22 is an air discharge channel 25 having the function of discharging the air in the open space 18 by the inner pressure difference of the bypass air passage 14, and the air flows in the path from the air communication channel-C 21 to the open space 18 and from the open space 18 to the air communication channel-D 22.

Figure 4:
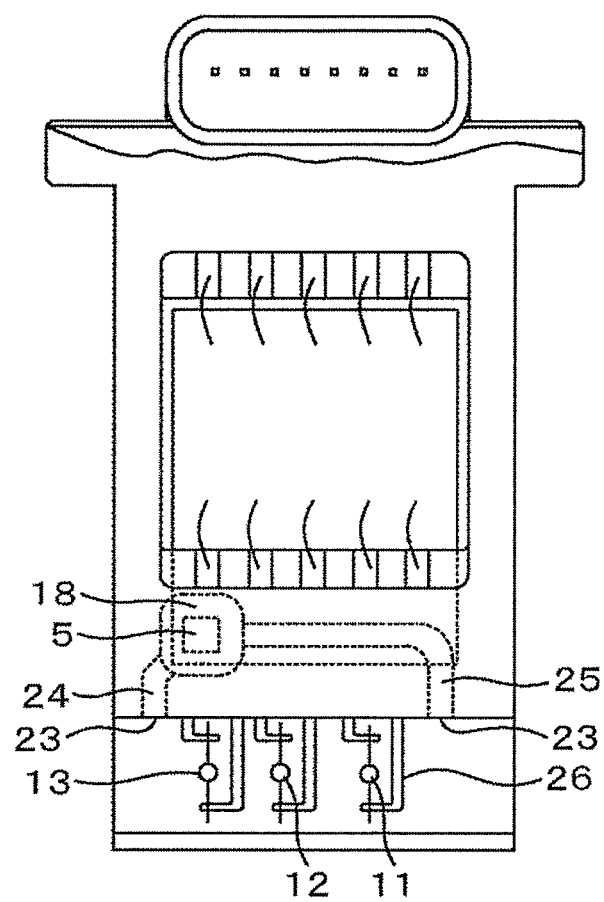
FIG. 4 is a sensor structure drawing showing another embodiment of the present invention.

FIG. 4 is a sensor structure drawing showing another embodiment of the present invention. Compared with the configuration shown in FIG. 3, structures such as the heating resistor 11 for measuring the mass airflow, the temperature compensation resistor 12 used in the mass airflow measurement, the intake air temperature sensor 13 independently used in the vehicle side, and terminal members 26, which support and fix them, are disposed between the air communication openings 23 of the air introduction channel 24 and the air discharge channel 25 in the bypass air passage 14. By virtue of these structures, pressure loss in the bypass air passage 14 is further increased, in other words, a larger pressure difference is generated between the two air communication openings 23 related to the air introduction channel 24 and the air discharge channel 25. Therefore, the effect of discharging the air is increased, and sufficient air can be sent to the part of the humidity sensing element 5.

Figure 5:
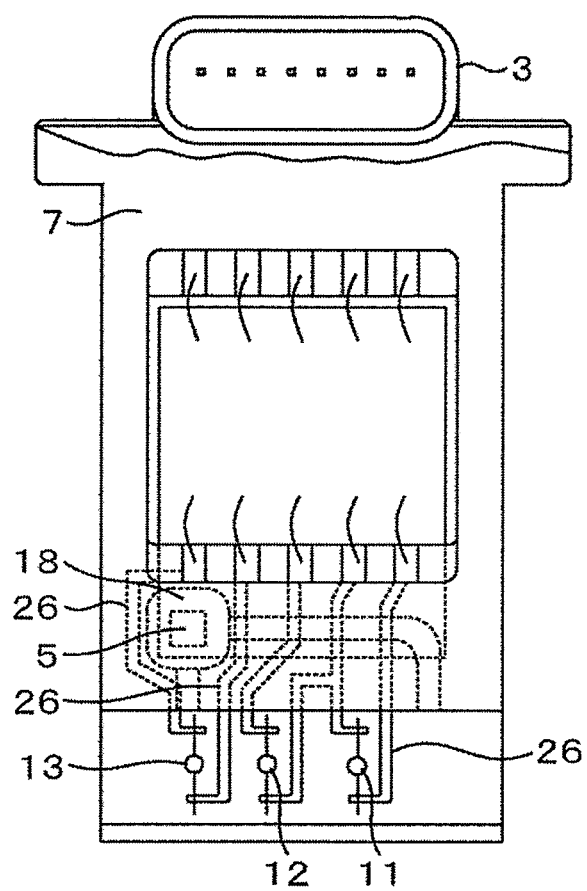
FIG. 5 is a sensor structure drawing showing another embodiment of the present invention.

FIG. 5 is a sensor structure drawing showing another embodiment of the present invention. The terminal members 26 which are integrally molded with the housing structural component 7 and support and fix the heating resistor 11, the temperature compensation resistor 12, and the intake air temperature sensor 13 are disposed so as to avoid the open space 18 in the housing structural component 7, and the open space 18 is characterized by being installed in the upper side of the stream than the heating resistor 11.

The mass airflow measurement device 3 is used by being installed in the flow of the main air flow passage 1 and serves as a resistance to the flow. The pressure loss in the main air flow passage 1 serves as a direct cause of reduction in the engine output or deterioration of fuel cost. Therefore, the front projected area of the mass airflow measurement device 3 is desired to be smaller, and the configuration shown in FIG. 5 is one means for reducing the thickness (width) size of the mass airflow measurement device 3.

Humidity measurement and air temperatures have a close relation, and relative humidity is a physical quantity that varies in accordance with the temperature of air. Therefore, the temperature environment around the humidity sensing element 5 is important. In the configuration shown in FIG. 5, the open space 18 is mounted in the upstream of the heating resistor 11 to avoid the thermal influence from the heating resistor 11. By virtue of the configuration thereof, a compact and highly-accurate multifunction sensor can be provided.

Figure 6:
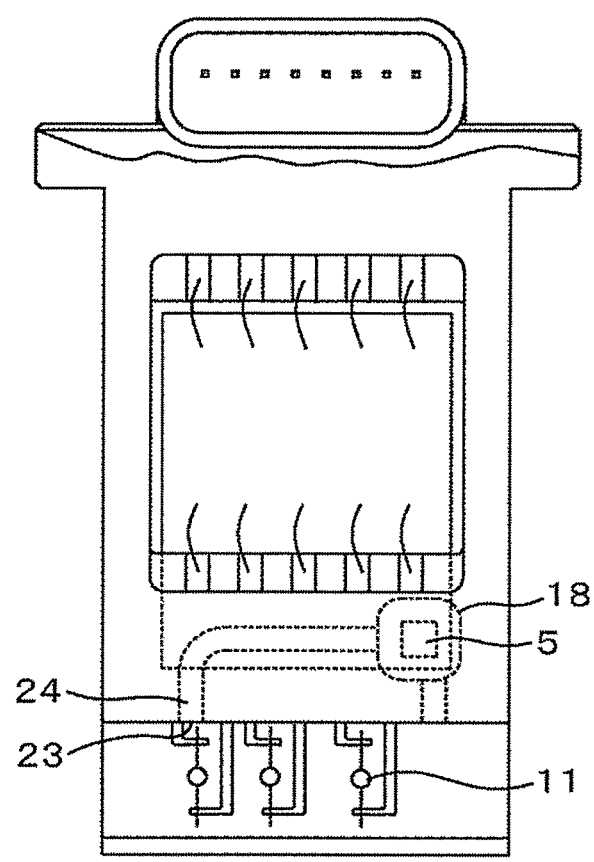
FIG. 6 is a sensor structure drawing showing another embodiment of the present invention.

FIG. 6 is a sensor structure drawing showing another embodiment of the present invention. Compared with the configuration shown in FIG. 5, this is an example in which the humidity sensing element 5 and the open space 18 are installed in the downstream side of the heating resistor 11. In the case in which the air communication opening 23 of the air introduction channel 24, which introduces measurement air to the humidity sensing element 5, is installed in the upstream side of the heating resistor 11, the humidity sensing element 5 is not much affected by the heat-release influence exerted on the downstream of the heating resistor 11. In this case, the positions of the humidity sensing element 5 and the open space 18 are not limited, and the degree of freedom of design is increased.

Figure 7:
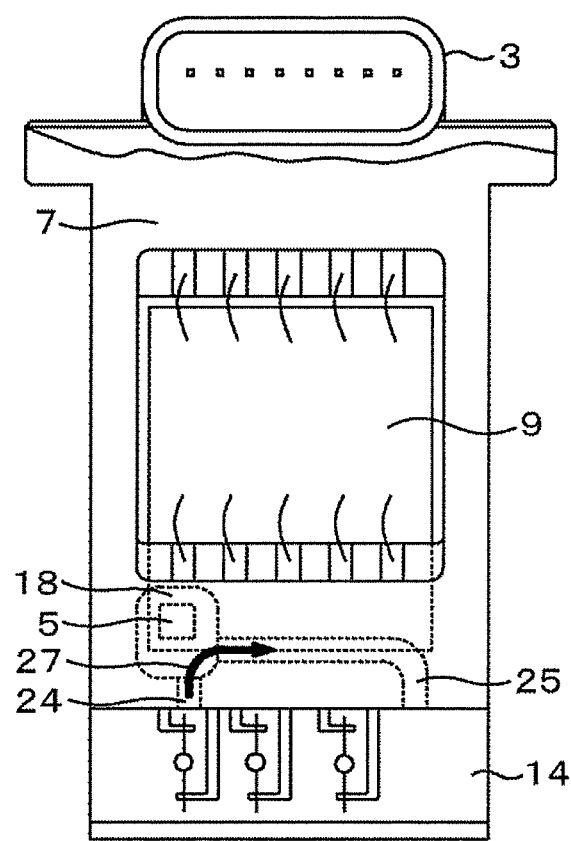
FIG. 7 is a sensor structure drawing showing another embodiment of the present invention.

FIG. 7 is a sensor structure drawing showing another embodiment of the present invention. The humidity sensing element 5 is installed on the electronic circuit board 9 of the mass airflow measurement device 3, and the humidity sensing element 5 is mounted in the open space 18 formed in the housing structural component 7.

The air introduction channel 24, which communicates between and connects the open space 18 and the bypass air passage 14 to each other in the upstream side of the bypass air passage 14, and the air discharge channel 25, which communicates between and connects the open space 18 and the bypass air passage 14 to each other in the downstream side of the bypass air passage 14, are provided. The humidity sensing element 5 is mounted at a position away from a streamline 27 (path of a main flow) formed at this point. An object thereof is to reduce the contamination density and prevent direct adhesion of contaminants by increasing the air volume of the open space 18. Even if contaminants flow into the open space 18, the contamination density can be reduced at the position of the humidity sensing element 5, and the risk that the contaminants may adhere to the humidity sensing element 5 can be reduced. When the humidity sensing element is mounted at the position deviated from the streamline 27 in the open space 18, the risk that the humidity sensing element 5 may be directly contaminated can be further reduced.

Figure 8:
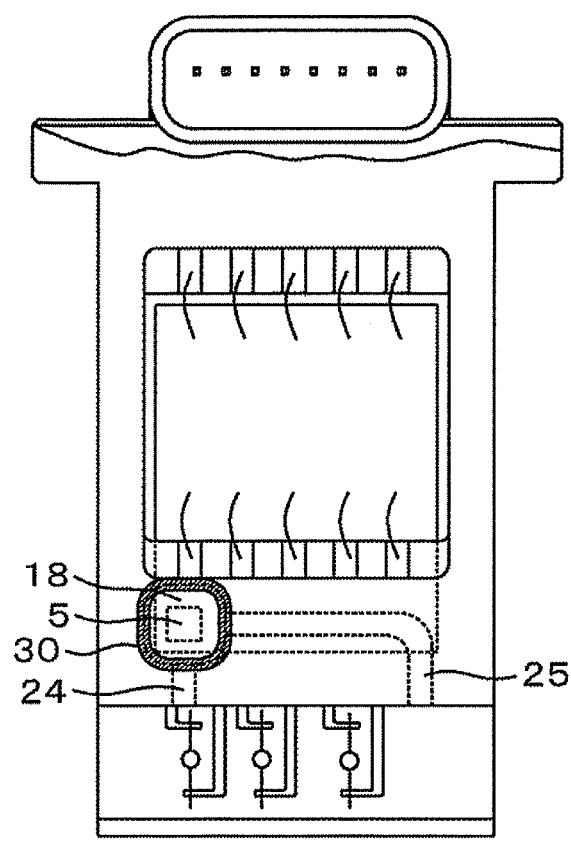
FIG. 8 is a sensor structure drawing showing another embodiment of the present invention.

FIG. 8 is a sensor structure drawing showing another embodiment of the present invention. The periphery of the open space 18 is sealed with a material having moisture absorbency such as a silicone adhesive 30 to further improve the resistance to the contaminants and water droplets floating in the air. If quick humidity measurement responsiveness is not required, humidity measurement can be sufficiently carried out with the present configuration.

Figure 9A:
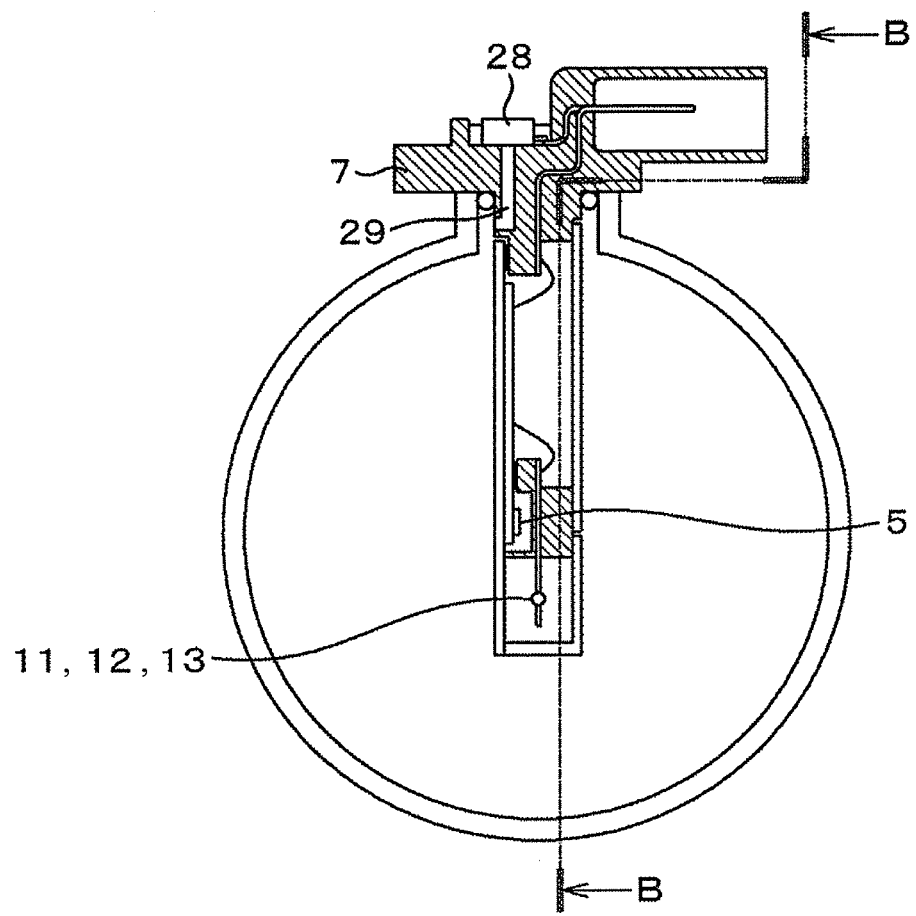
FIG. 9A is a sensor structure drawing showing an embodiment in which the present invention is configured to be a multifunction sensor.
Figure 9B:
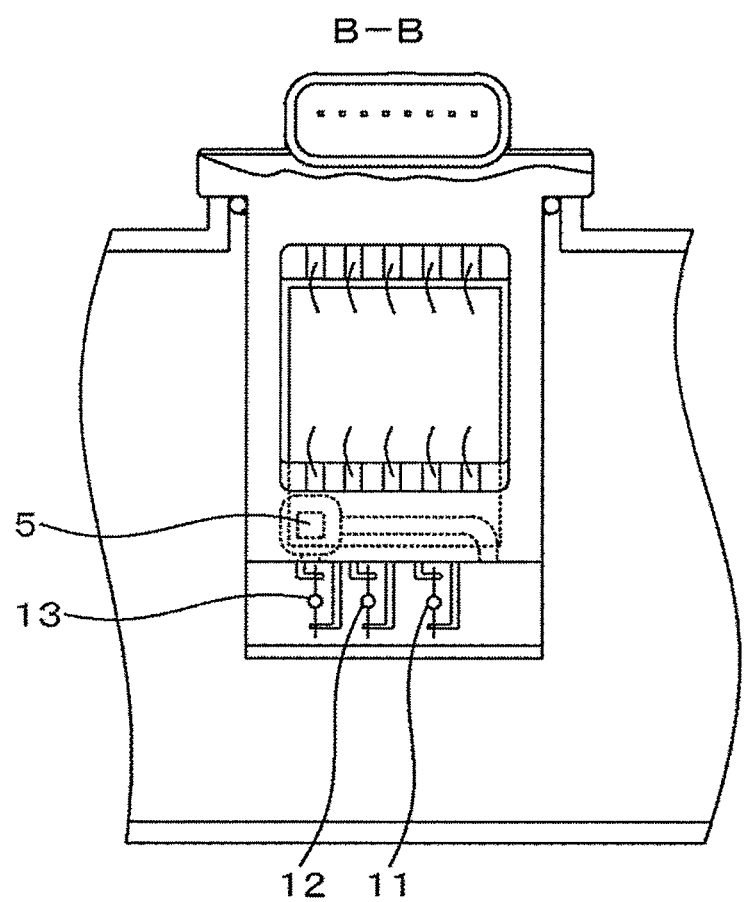
FIG. 9B is a B-B cross sectional view of FIG. 9A.

FIGS. 9A and 9B show an embodiment in which the present invention is applied to a multifunction sensor integrated with a mass airflow meter and a pressure measurement device and show a B-B cross section thereof. The pressure measurement device 28 is mounted on the housing structural component 7, and a pressure intake port 29 communicating between the mounted location of the pressure measurement device 28 and the interior of the main air flow passage 1 is provided so that at least three physical quantities, i.e., the mass airflow, air humidity, and air pressure can be detected and output.

Figure 10:
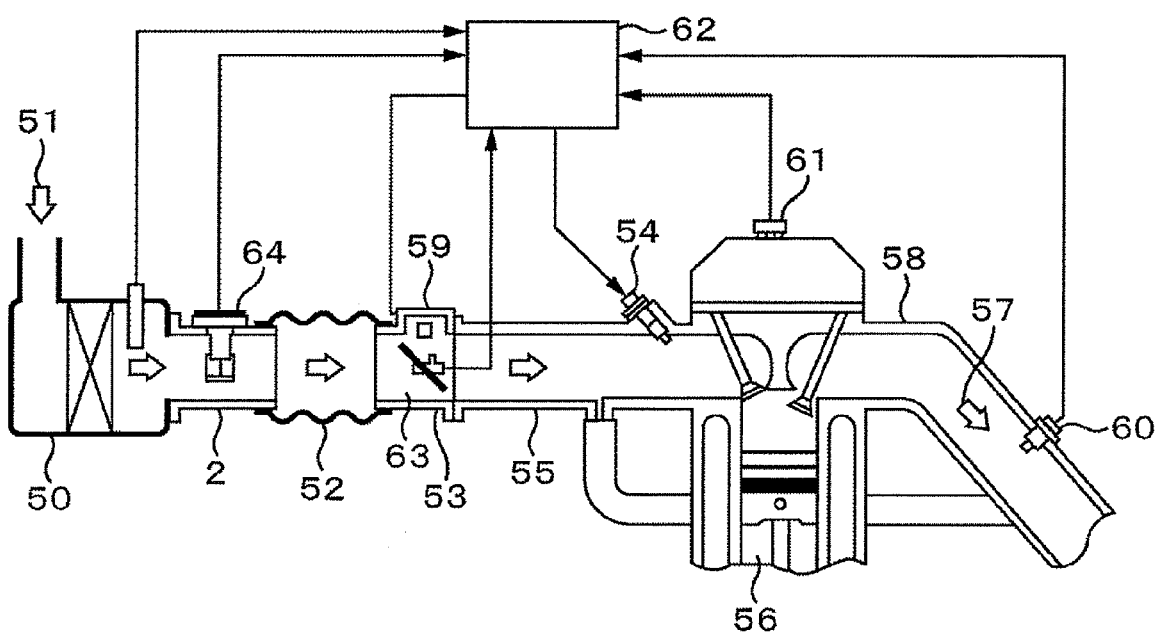
FIG. 10 is an embodiment in which a product of the present invention is applied to an internal combustion engine of an electronic fuel injection type.

In the end, an embodiment in which the present invention is applied to an internal combustion engine of an electronic fuel injection type is shown by using FIG. 10. Intake air 51 taken in from an air cleaner 50 is taken into an engine cylinder 56 through the main air flow passage component 2 in which a multifunction sensor 64 is installed, an intake air duct 52, and an intake manifold 55 provided with a throttle body 53 and a fuel injector 54 to which fuel is supplied. Meanwhile, an exhaust gas 57 generated in the engine cylinder 56 is discharged through an exhaust manifold 58.

A mass airflow signal, a humidity signal, a pressure signal, and a temperature signal output from the multifunction sensor 64, a throttle valve angle signal output from a throttle angle sensor 59, an oxygen concentration signal output from an oxygen meter 60 provided in the exhaust manifold 58, an engine speed signal output from an engine speed meter 61, etc. are input to an engine control unit 62. The engine control unit 62 sequentially calculates these signals to obtain an optimum fuel injection amount and optimum output torque and controls the fuel injector 54 and the throttle valve 63 by using the values thereof.

DESCRIPTION OF SYMBOLS

1 MAIN AIR FLOW PASSAGE
2 MAIN AIR FLOW PASSAGE COMPONENT
3 MASS AIRFLOW MEASUREMENT DEVICE
4 INSTALLATION HOLE
5 HUMIDITY SENSING ELEMENT
6 SEAL MATERIAL
7 HOUSING STRUCTURAL COMPONENT
8 BASE PLATE
9 ELECTRONIC CIRCUIT BOARD
10 COVER
11 HEATING RESISTOR
12 TEMPERATURE COMPENSATION RESISTOR
13 INTAKE AIR TEMPERATURE SENSOR
14 BYPASS AIR PASSAGE
15 BYPASS AIR PASSAGE STRUCTURAL COMPONENT
16 BONDING WIRE
17 CONNECTOR TERMINAL
18 OPEN SPACE
19 AIR COMMUNICATION CHANNEL-A
20 AIR COMMUNICATION CHANNEL-B
21 AIR COMMUNICATION CHANNEL-C
22 AIR COMMUNICATION CHANNEL-D
23 AIR COMMUNICATION OPENING
24 AIR INTRODUCTION CHANNEL
25 AIR DISCHARGE CHANNEL
26 TERMINAL MEMBER
27 STREAMLINE
28 PRESSURE MEASUREMENT DEVICE
29 PRESSURE INTAKE PORT
30 SILICONE ADHESIVE
50 AIR CLEANER
51 INTAKE AIR
52 INTAKE AIR DUCT

53 THROTTLE BODY
54 FUEL INJECTOR
55 INTAKE MANIFOLD
56 ENGINE CYLINDER
57 EXHAUST GAS
58 EXHAUST MANIFOLD
59 THROTTLE ANGLE SENSOR
60 OXYGEN METER
61 ENGINE SPEED METER
62 ENGINE CONTROL UNIT
63 THROTTLE VALVE
64 MULTIFUNCTION SENSOR
65 ADHESIVE

What is claimed is:

1. A sensor structure comprising:
a mass airflow measurement element that is configured to measure a mass airflow flowing in an intake pipe;
a humidity sensing element that is configured to sense a humidity of air flowing in the intake pipe;
a housing structural component having a connector that is configured to receive external signals and to send signals generated by a terminal component of the connector;
a bypass passage that is formed by a part of the housing structural component that protrudes into the intake pipe and that takes in part of the air that flows in the intake pipe, the mass airflow measurement element being mounted in the bypass passage;
a space that is formed in the housing structural component in the vicinity of the bypass passage;
a first air communication channel that is configured to connect an upstream side of the bypass passage to the space; and
a second air communication channel that is configured to connect a downstream side of the bypass passage to the space, wherein
the humidity sensing element is mounted in the space, and
a part of the space is substantially devoid of a structure sealed by at least one of an adhesive and a seal material.

2. The sensor structure according to claim 1, further comprising:
at least one air communication channel that is configured to connect the space to the intake pipe.

3. The sensor structure according to claim 2, further comprising:
a pressure measurement device that is configured to measure a pressure, the pressure measurement device being mounted on the housing structural component.

4. The sensor structure according to claim 1, wherein
an inner pressure of the first air communication channel is larger than an inner pressure of the second air communication channel,
the first air communication channel is an air introduction channel that is configured to introduce the air flowing in the bypass passage, and
the second air communication channel is an air discharge channel that is configured to discharge the air in the space due to a pressure difference between the inner pressures.

5. The sensor structure according to claim 4, wherein
the bypass passage is provided with an inlet opening positioned at the air introduction channel and an outlet opening positioned at the air discharge channel, and
a heating resistor and a temperature compensation thermosensitive resistor, constituting the mass airflow measurement element, are installed in the bypass passage between the inlet opening and the outlet opening.

6. The sensor structure according to claim 5, further comprising:
a terminal member that is configured to retain the heating resistor or the temperature compensation thermosensitive resistor, the terminal member being disposed so as to avoid installation interference with the space, wherein
the space is provided upstream, along a flow direction of the mass airflow in the bypass passage, from the heating resistor and the temperature compensation thermosensitive resistor.

7. The sensor structure according to claim 6, further comprising:
a pressure measurement device that is configured to measure a pressure, the pressure measurement device being mounted on the housing structural component.

8. The sensor structure according to claim 5, wherein
the inlet opening is provided upstream along the flow direction of the mass airflow in the bypass passage with respect to the heating resistor, and
the space and the humidity sensing element are positioned downstream along the flow direction of the mass airflow in the bypass passage with respect to the heating resistor.

9. The sensor structure according to claim 8, further comprising:
a pressure measurement device that is configured to measure a pressure, the pressure measurement device being mounted on the housing structural component.

10. The sensor structure according to claim 5, further comprising:
a pressure measurement device that is configured to measure a pressure, the pressure measurement device being mounted on the housing structural component.

11. The sensor structure according to claim 4, wherein
the humidity sensing element is installed in the space in an offset arrangement, so as to be out of a main stream of the flow of the air from the air introduction channel to the air discharge channel.

12. The sensor structure according to claim 11, further comprising:
a pressure measurement device that is configured to measure a pressure, the pressure measurement device being mounted on the housing structural component.

13. The sensor structure according to claim 4, wherein
a periphery of the space is sealed by at least one of an adhesive and a seal material having moisture absorbency properties.

14. The sensor structure according to claim 13, further comprising:
a pressure measurement device that is configured to measure a pressure, the pressure measurement device being mounted on the housing structural component.

15. The sensor structure according to claim 4, further comprising:
a pressure measurement device that is configured to measure a pressure, the pressure measurement device being mounted on the housing structural component.

16. The sensor structure according to claim 1, further comprising:
a pressure measurement device that is configured to measure a pressure, the pressure measurement device being mounted on the housing structural component.

17. The sensor structure according to claim 1, wherein
the first air communication channel and the second air communication channel each have: i) one end that is directly connected to the bypass page, and ii) another end that is directly connected to the space.

18. The sensor structure according to claim 1, wherein the bypass passage extends along a longitudinal direction of the sensor structure in a region proximate to a center of the intake pipe.

* * * * *